No. 718,937. PATENTED JAN. 20, 1903.
H. G. JOHNSTON.
GRIPPING DEVICE FOR WELL BORING APPARATUS.
APPLICATION FILED MAY 19, 1902.
NO MODEL. 2 SHEETS—SHEET 1.
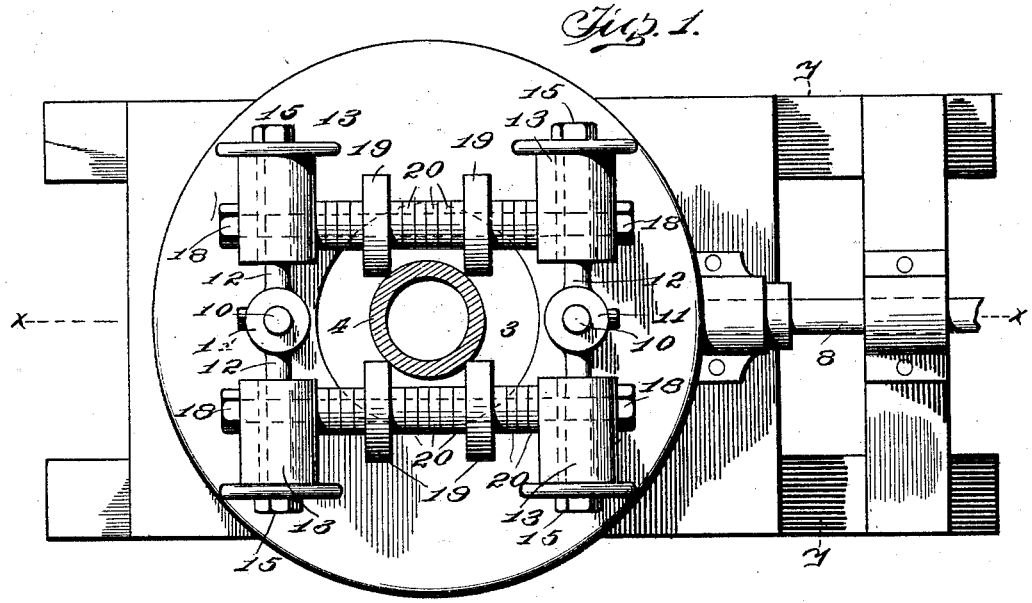
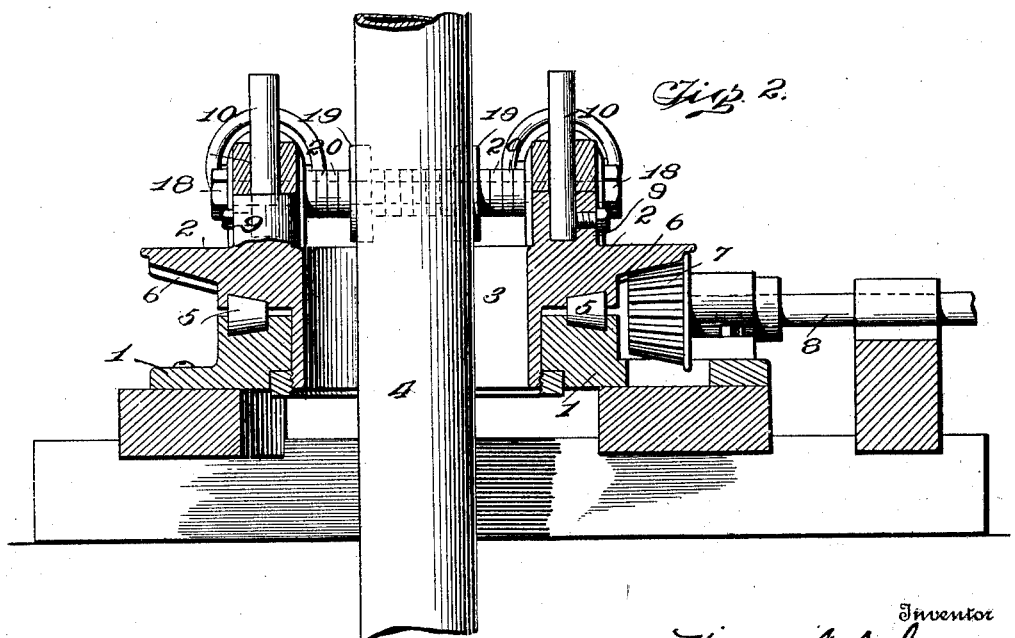

No. 718,937. PATENTED JAN. 20, 1903.
H. G. JOHNSTON.
GRIPPING DEVICE FOR WELL BORING APPARATUS.
APPLICATION FILED MAY 19, 1902.
NO MODEL. 2 SHEETS—SHEET 2.
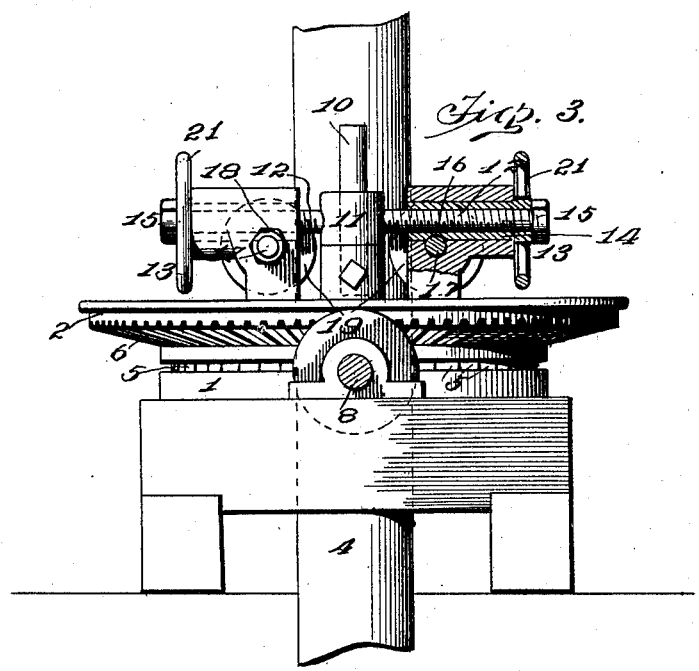
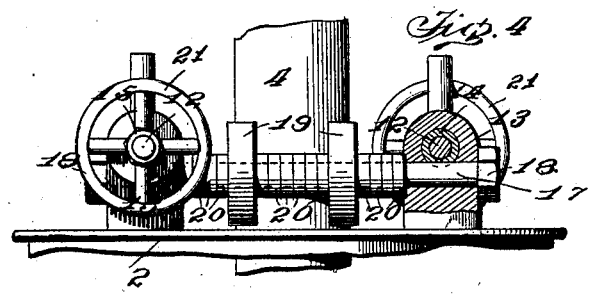
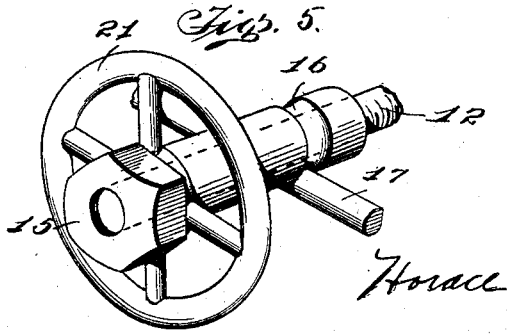
Witnesses
Inventor
Horace G. Johnston
By Mason Fenwick Lawrence
Attorneys

UNITED STATES PATENT OFFICE.

HORACE G. JOHNSTON, OF CORSICANA, TEXAS, ASSIGNOR TO THE AMERICAN WELL AND PROSPECTING COMPANY, OF CORSICANA, TEXAS, A CORPORATION OF TEXAS.

GRIPPING DEVICE FOR WELL-BORING APPARATUS.

SPECIFICATION forming part of Letters Patent No. 718,937, dated January 20, 1903.

Application filed May 19, 1902. Serial No. 108,054. (No model.)

*To all whom it may concern:*

Be it known that I, HORACE G. JOHNSTON, a citizen of the United States, residing at Corsicana, in the county of Navarro and State of Texas, have invented certain new and useful Improvements in Gripping Devices for Well-Boring Apparatus; and I do hereby declare the following to be a full, clear, and exact description of the invention, such as will enable others skilled in the art to which it appertains to make and use the same.

My invention relates to means for gripping a well-tube to rotate the same and at the same time not interfere with the downward movement or descent of said tube.

The invention consists of certain novel constructions, combinations, and arrangements of parts, as will be hereinafter described and specifically claimed.

In the accompanying drawings, Figure 1 is a top plan view of my improved gripping and rotating mechanism. Fig. 2 is a vertical transverse section on the line $x\ x$ of Fig. 1. Fig. 3 is a vertical transverse section on the line $y\ y$ of Fig. 1 and looking toward the gripping mechanism, part of the mechanism being shown in section. Fig. 4 is a fragmentary side elevation, parts being also shown in section. Fig. 5 is a detail perspective view of the sleeved nut.

In drilling wells of considerable depth in which a well-tube is employed, which tube is provided at its lower end with means for cutting or drilling, it is customary to provide some kind of means for gripping the tube and for rotating the same to accomplish the cutting or drilling and at the same time not interfere with the downward or endwise movement of said tube. Various devices have been devised for this purpose. My present invention is designed to accomplish this result in a very simple, effectual, and practical manner.

I employ a stationary base-plate or table 1 and a rotating upper plate or table 2, each being provided with a central aperture 3, through which the well-tube 4 passes in a vertical manner, as shown. Antifriction-bearings of any suitable construction are provided between the upper and lower plates, grooves or runways being preferably provided in said plates for the accommodation of the antifriction-bearings, said runways being formed, preferably, by providing flanges on the outer edges of the upper and lower plates, which overhang the antifriction-bearings and prevent the latter from having a lateral movement without interfering with their rotation.

As stated above, any suitable antifriction-bearings may be provided; but I prefer to employ cone-bearings, as 5.

The upper plate 2 is provided with any suitable means, so that it may be engaged in order that a rotary movement may be imparted to the same. This is preferably accomplished by beveling the under edge of said upper plate or table and providing the same with teeth, as 6, which latter are engaged by a beveled pinion 7, carried by a suitable operating-shaft 8, which latter is operated by any suitable means. (Not shown.)

Secured to the upper surface of the top plate or table 2 are upwardly-extending bosses 9, which are arranged across the central aperture 3 and diametrically opposite each other. These bosses are provided with upwardly-extending pins, stakes, or reduced portions 10. Apertured heads 11, from which project in opposite direction screw-threaded rods 12, are passed over the pins or stakes 10. Longitudinally-apertured blocks 13 are slipped onto the ends of the screw-threaded rods 12, and internally-threaded sleeve-nuts 14, having hand-wheels 21 and heads 15, are screwed onto the outer ends of each of the threaded rods 12, the outer surface of each of the sleeve-nuts being smooth and preferably rounded. For convenience in turning the heads 15 are made square or polygonal in shape, so as to readily receive a wrench. By means of the hand-wheels 21 a quick adjustment may be secured by hand; but when necessary to adjust to a greater extent than can be secured by hand a wrench can be used on polygonal-shaped head 15, as just stated. Each of the sleeve-nuts 14 is provided with an annular groove 16. Rods or shafts 17 17 extend transversely through the blocks 13 and are provided on their outer ends with nuts 18, the said shafts engaging the annular grooves 16 in the sleeve-nuts 14. Each shaft 17 carries a plurality, preferably two, of rings or jaws 19, having sharp biting edges, which rings are loosely mounted on the shafts, so as to be capable of rotating and at the same time gripping the well-tube, as will now be described.

In order to enable the rings or jaws 19 to grip well-tubes of different diameters, it is necessary to adjust the shaft 17, carrying the said rings, inward or outward, and this is accomplished by grasping the heads 15 of the sleeve-nuts 14 with a suitable implement and turning the same, which action causes the threaded shafts 8 to be fed through the said sleeve-nuts and the blocks 13, carrying the shafts 17 and the rings or jaws 19, inward or outward—that is, toward or from the well tubing or casing, according to the direction in which the sleeve-nut is turned. The annular grooves 16, in which the shafts 17 rest, hold the sleeve-nuts 14 in position in the blocks 13 and cause the said blocks to be moved evenly, uniformly, and steadily backward and forward. When the gripping-jaws have been adjusted to the desired position, they will be held firmly in such position in contact with the well tube or casing, gripping the same so that when the upper plate or table is rotated the well-tube will be rotated simultaneously without interfering with the downward or endwise movement of such tube, owing to the fact that the said rings or jaws 19 rotate on their shafts 17. Suitable spacing-rings of different thicknesses, as 20, may be arranged on the shaft 17 and properly adjust the rings or jaws 19 with respect to the well tube or casing. The gripping rings or jaws 19 are preferably made in the form of solid cylindrical rings having a central aperture or eye to enable them to be slipped on the shafts 17 and at the same time allow the said gripping-rings to rotate.

By employing the construction of bosses 9 and pins 10 the mechanism, except the bosses, can be lifted off from the upper rotating plate or table whenever desired, and also when necessary either shaft 17, carrying the gripping-rings 19, can be removed and new gripping-rings replaced or the old ones repaired and returned to their proper positions without disturbing the rest of the mechanism.

It will be observed that by the use of non-revoluble screw-shafts so constructed that they can be moved up and down on the pins and stakes the machinery will be saved from much undue wear, as in rough drilling the upper plate of the table is not thrown up and down, thus keeping the pitch-lines of the pinion and upper plate in coincidence. In drilling where the rock has seams or crevices the gripping mechanism in my construction only plays up and down on the pins, thereby not affecting the table.

Another important advantage of my construction is that in working over pipe-couplings with the gripping device—that is, where two sections of well-tubing are connected by couplings—in my construction it is simply necessary to raise the gripping device on the pins or stakes to pass the coupling. The gripping mechanism is not required to be kept in contact with the upper plate of the table, but will be carried around so long as it is in contact with the pins or stakes. I regard this as a very important feature of my invention.

What I claim is—

1. In a well-drilling apparatus, the combination with a rotary plate or table, and means for rotating the same, of means for gripping the well-tube so as to rotate the same without interfering with its endwise movement, comprising oppositely-arranged, adjustable screw-threaded shafts carried by the rotating plate, means for movably supporting said shafts, and holding them from turning, adjustable blocks arranged on said shafts, internally-threaded sleeve-nuts carried by said shafts and also extending through the blocks, the said sleeve-nuts being provided with enlargements or heads adapted to bear against the blocks by which the said nuts may be turned to adjust the position of the blocks on the shafts, plain shafts extending at right angles to the threaded shafts and extending transversely through the blocks, and gripping rings or jaws carried by the plain shafts and constructed to rotate upon the same to grip the well-tube with their jaws, substantially as described.

2. In a well-drilling apparatus, the combination with a rotary plate or table, and means for rotating the same, of means for gripping the well-tube so as to rotate the same without interfering with its endwise movement, consisting of longitudinally-apertured blocks, two parallelly-arranged screw-threaded shafts carried by the rotating plate, each one of which extends through two blocks, internally-threaded sleeve-nuts carried by said shafts and also extending through the blocks, said sleeve-nuts being provided with enlargements or heads to bear against the blocks, and also provided with annular grooves, plain shafts extending at right angles to the threaded shafts, and extending transversely through the blocks, and engaging the annular grooves in the sleeve-nuts, and gripping jaws or rings carried by the plain shafts and constructed to rotate on the same and grip the well-tube with their edges, substantially as described.

3. In a well-drilling apparatus, the combination with a rotary plate or table, and means for rotating the same, of means for gripping the well-tube so as to rotate the same without interfering with its endwise movement, consisting of longitudinally-apertured blocks, two parallelly-arranged screw-threaded shafts carried by the rotating plate, each one of which is provided with a centrally, vertically apertured enlargement which rests on the boss carried by the plate, which boss is provided with a reduced portion or pin which extends through the vertical aperture of the enlarged portion of the said screw-threaded shafts, internally-threaded sleeve-nuts carried by said shafts and also extending through the blocks, said sleeve-nuts being provided with enlargements or heads to bear against the blocks, plain shafts extending at right angles to the threaded shafts and extending transversely through the blocks and provided with nuts on their outer ends to hold them in position on the blocks, gripping jaws or rings carried by the plain shafts and constructed to rotate on the same, and blocks arranged on the said plain shafts for properly spacing the gripping-jaws, substantially as described.

4. In a well-drilling machine, the combination with a rotary plate or table, vertically-arranged pins or stakes carried by said table, horizontally-arranged shafts having bearings engaging said pins or stakes, gripping means carried by said shafts for rotating a well-tube without interfering with its endwise movement, and means for moving the said shafts to and from the pins or stakes, substantially as described.

5. In a well-drilling machine, the combination with a rotary plate or table, vertically-arranged pins or stakes carried by said table, heads having bearings movably engaging said pins or stakes and carrying horizontally-arranged screw-threaded rods which project from the heads in opposite directions, and horizontally-arranged shafts extending at right angles to the rods, gripping devices carried by said horizontal shafts for turning a well-tube and yet permitting of its endwise movement, and means for moving the shafts to and from the pins or stakes, substantially as described.

6. In a well-drilling machine, the combination of a rotary plate or table, non-revoluble shafts carried thereby, gripping mechanism connected with the said non-revoluble shafts for turning a well-tube and yet permitting of its endwise movement, and means for moving the parts of the gripping mechanism independently upon said non-revoluble shafts to and from the well-tube to be gripped.

7. In a well-drilling machine, the combination of a rotary table, vertically-arranged pins or stakes carried by said table, horizontally-arranged, non-revoluble shafts movably secured upon said pins or stakes, so that the gripping mechanism may be raised or lowered with respect to the table and yet turn a drill-tube, and a gripping mechanism connected with said horizontal shafts and adjusted thereby, substantially as described.

8. In a well-drilling machine, the combination of a rotary plate, and gripping means secured thereon, and capable of movement up and down with respect to the plate, means upon the plate for holding said gripping means and permitting the up-and-down movement thereof without interfering with the rotation of the plate, the said gripping means also permitting of the drill-tube moving longitudinally, substantially as described.

9. In a well-drilling machine, the combination of a rotary table, pins or stakes carried by the said table, gripping means having a movable engagement with said pins, so that the gripping device may be raised or lowered without interfering with the rotation of the table, and grippers carried by the gripping means for turning a well-tube and yet permitting of its endwise movement, substantially as described.

In testimony whereof I hereunto affix my signature in presence of two witnesses.

HORACE G. JOHNSTON.

Witnesses:
M. S. READ,
ELMO JEFFERS.